Sept. 29, 1936.　　C. J. DAVISSON　　2,055,655
ELECTRON LENS
Filed April 21, 1933　　2 Sheets-Sheet 1
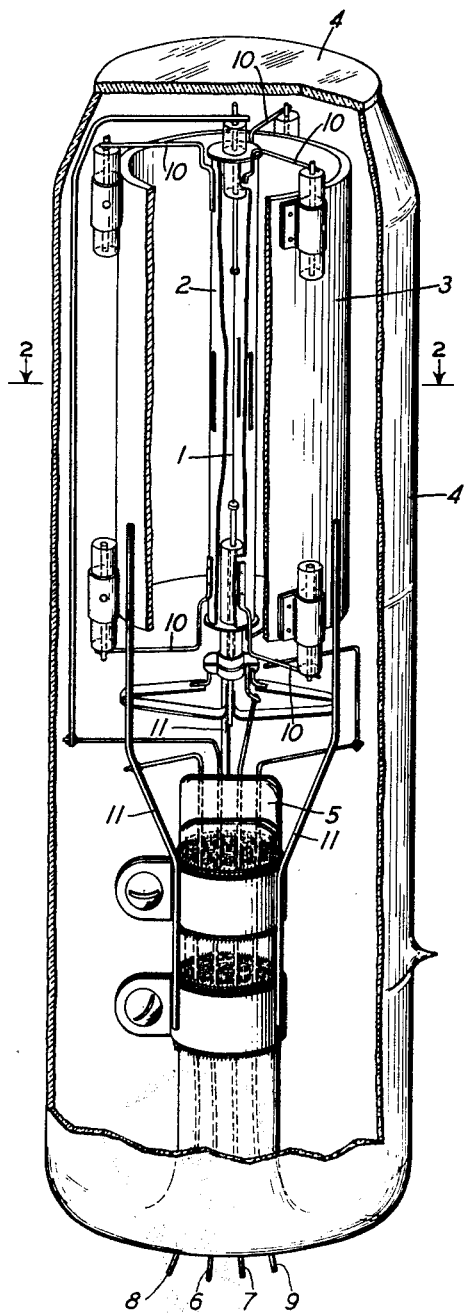
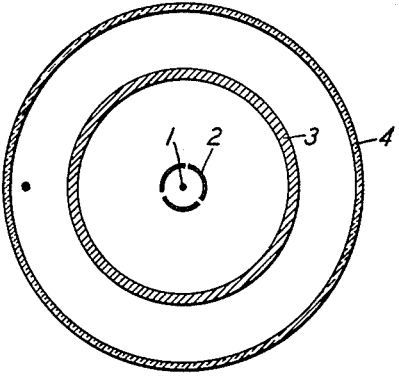
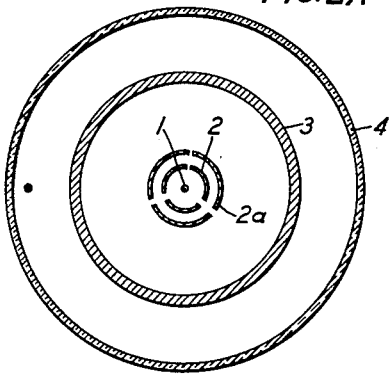
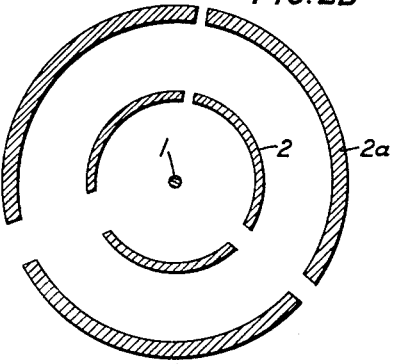
INVENTOR
C. J. DAVISSON
BY *Guy T. Morris*
ATTORNEY Sept. 29, 1936.   C. J. DAVISSON   2,055,655
ELECTRON LENS
Filed April 21, 1933   2 Sheets-Sheet 2
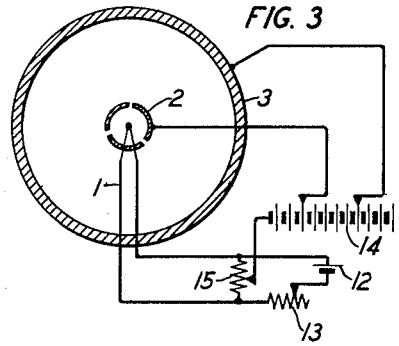
FIG. 3
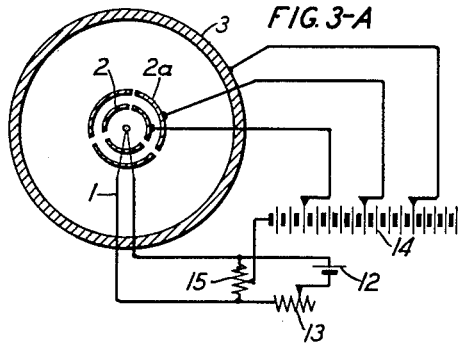
FIG. 3-A
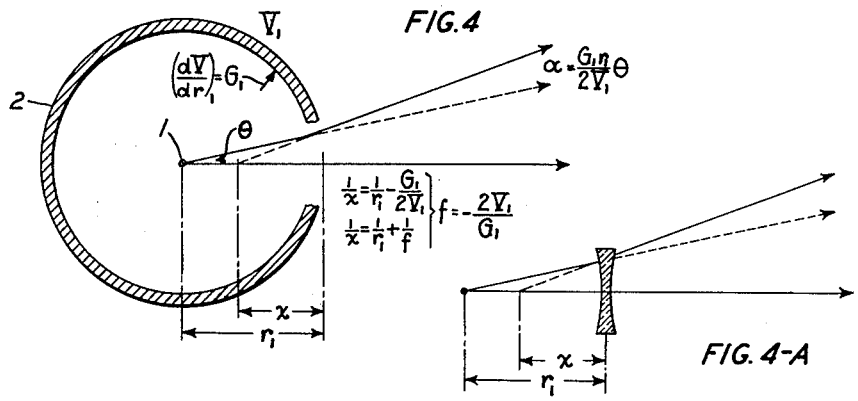
FIG. 4
FIG. 4-A
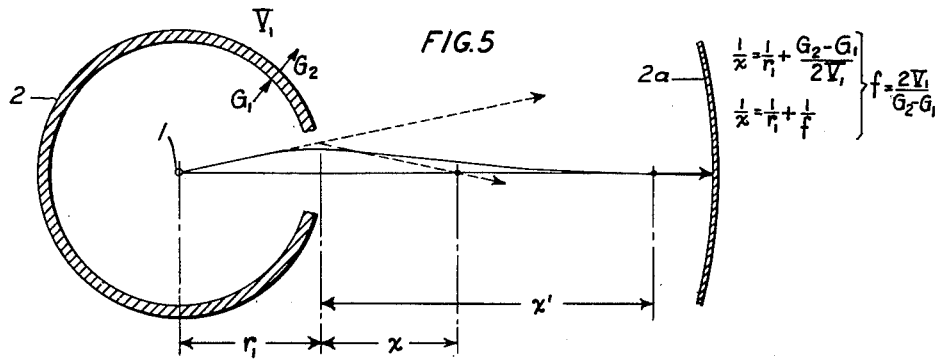
FIG. 5
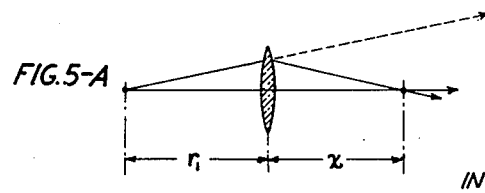
FIG. 5-A
INVENTOR
C.J. DAVISSON
BY Guy T. Morris
ATTORNEY Patented Sept. 29, 1936

2,055,655

UNITED STATES PATENT OFFICE 2,055,655

ELECTRON LENS

Clinton J. Davisson, Short Hills, N. J., assignor to Bell Telephone Laboratories, Incorporated, New York, N. Y., a corporation of New York Application April 21, 1933, Serial No. 667,249

2 Claims. (Cl. 250—27.5)

This invention relates to electron lenses, that is, physical structure of electrically charged members affecting the trajectories of electrons in space to cause a beam or bundle of rays of electrons to assume a prescribed form analogously as a light beam may be affected by an optical lens.

It has been discovered by calculation and verified by experiment that electrons, on passing through an aperture in a charged conductor, are deflected quite analogously as a lens affects an incident light beam. That is, the beam may be brought to a focus according to a geometrical plan which may be analyzed in exactly the same way as in the case of an optical lens, the focal length being expressed in terms of the electrical potential of the charged conductor with relation to the electron emitting element and the potential gradient at the charged conductor. Thus, a slot in a cylindrical charged conductor coaxial with a filamentary cathode functions similarly as a cylindrical type of optical lens and a circular hole in a flat anode has the properties of a spherical optical lens. Electron lenses of these simple types are characterized by the fact that the focal lengths are negative, that is, the lenses are of the diverging type. It is possible, however, to obtain a positive lens action by adding a charged conductor outside the first one and establishing a suitable potential difference between the two conductors. In such a lens the significant factor is the difference between the potential gradients at opposite sides of the slotted conductor (the inner conductor) in comparison with the single potential gradient at the corresponding conductor of the simpler cases where a single charged conductor is used (there being no gradient outside of the slotted conductor in such cases). An electron lens system of this more complex type may be readily adjusted as to focal length by varying the potential of the outer conductor so as to give the focal length any desired value either positive or negative.

The phenomenon of deflection of an electron when passing through an aperture in a charged condenser depends, as is well known, on the distortion of the electrostatic field resulting from the substitution of the aperture for the solid medium. It has been known in a general way that the magnitude of this deflection depends on various factors such as the amount of the distortion, and the velocity of the electron. It has been supposed that since the field strength near a sharp edge is exceptionally great, the deflection received by electrons passing near such edges must be exceptionally large. Applicant has discovered, however, that this is not the case; to a first approximation the deflection increases uniformly with the distance of the line of approach of electrons from the center of the opening so that there is nothing exceptional about the deflection received by an electron which passes near the edge. It is this direct proportionality between the deflection and the distance of the line of approach from the center of the aperture that makes it possible to regard the field about the aperture as a lens. Like an optical lens, the deflection, and resultantly the focal length, is independent of the width of the opening, within limits. Analogously to the optical lens, however, sharper focussing attends the use of a relatively narrow aperture.

It is an object of the invention to develop a system of electon-optical design based on the principles of electrodynamics.

It is another object of the invention to make a precise application of the principles of electrodynamics to the problem of forming electrons into beams of prescribed characteristics.

A more specific object of the invention is to provide specifications of geometrical and electrical dimensions of an electron-optical system for forming electrons into beams of prescribed characteristics as, for example to cause said beams to simulate a light beam as effected by an optical lens.

The invention, in its specific aspect as an electron lens organization, is adaptable in the fields in which electron beams are used, to function identically as the analogous optical lens organization and to have all of the advantages in that field that are traditionally associated with the use of optical systems. In its broader aspect as providing a means for a more accurate conformation of an electron beam than by conventional methods, the use of the invention tends to enhance the efficacy of practically all of the old devices using electron beams. It is of particular use where a very narrow and well-defined beam may be desired or where the beam should be accurately focussed on a given point, as, for example, in the production of X-rays. Another application is the formation of electron images of emitting surfaces and of stencils wherein what may be determined a multiple-beam takes the place of the single beam more generally assumed in the above.

Other objects and features of the invention will be apparent from the following specification and appended claims, when taken with the drawings in which:

Fig. 1 is a side elevation, partially in section, of a cathode ray device utilizing the electron lens principle of the invention in a practical form;

Fig. 2 is a cross-section of the device of Fig. 1 at line 2—2 thereof;

Fig. 2A is a similar cross-sectional view of a structure varied from that of Fig. 1 by the use of an additional slotted cylinder to cause the lens system to simulate a compound optical lens system;

Fig. 2B illustrates, on a magnified scale, the two slotted cylinders of Fig. 2A, that is, the two inner cylinders of the four cylinders (three metal cylinders and glass envelope) shown in Fig. 2A;

Figs. 3 and 3A correspond, respectively, to Figs. 2 and 2A and comprise a diagrammatic showing of the electrical circuit relations involved in the use of a structure of these earlier numbered figures;

Fig. 4 is a diagrammatic representation of a very simple type of electron lens and is for the purpose of assisting in the theoretical analysis of the electron lens action generally;

Fig. 4A is a corresponding representation applicable to an optical lens of the same type;

Fig. 5, similarly as Fig. 4, is used to assist in the theoretical analysis of the more complex lens device of Figs. 1, 2, and 3; and Fig. 5A, similarly as Fig. 4A, illustrates the optical lens analog.

The cathode ray device illustrated by Fig. 1 comprises generally a filamentary electron emitting element, the slotted charged conductor which constitutes perhaps the principal feature of the invention and a coaxial anode-like charged conductor together with the requisite mounting structure. The three above elements, which are identified respectively by reference numerals 1, 2, and 3, are enclosed by evacuated envelope 4. The top of this envelope as illustrated at 4 is made plane to provide opportunity to photograph the forms of the beams as revealed by radiation from mercury vapor which is present in the tube at a low pressure and which is excited to radiation by the electrons in their paths. The four conductors shown extending from the device through the press 5 are connected to the three above elements, conductors 6 and 7 to the cathode, which is in the form of a filament extending axially of the other two elements and of substantially the same length, conductor 8 to charged conductor 3 through one of the three supports 11, and conductor 9 to the slotted cylindrical element by way of one of the three supports for said element, the third supporting element 10 being obscured, in Fig. 1, by the element 3 and immediately associated structure.

The coaxial relation of the three significant electrical elements, as above, and the envelope is well shown in the sectional view of Fig. 2 which also shows the three slots in the lens element 2. The lengths of the slots, that is, their dimensions in axial directions, is not of significance. Their widths are not critical although, similarly as the width of a cylindrical optical lens such widths should be small as compared with the other geometrical dimensions of the lens organization as a whole in order to give a sufficient degree of definition and accurate focussing. The use of three slots, as shown, is not of significance as compared with a single slot, amounting merely to a multiplication of structure with a resultant multiplication of effect. Such a structure as is illustrated, however, has actually been used, with observations made on the emitted electrons as affected by each of the three lenses constituted by the three slots.

Fig. 2A illustrates a section, like the showing of Fig. 2, of a cathode ray device not shown which is exactly like that illustrated by Fig. 1 except only for the addition of a second slotted lens conductor 2a. In the lens organization as a whole the slots correspond each for each, that is, there are three sets of lens systems each comprising a pair of slots arranged colinearly, in a radial direction, with a portion of the filament. There is no necessary or critical relation between the widths of the slots of each pair. This relation of the lens elements is as shown in Fig. 2B.

The electrical circuit relations for the devices shown in section in Figs. 2 and 2A are shown respectively in Figs. 3 and 3A in which a similar numbering is used so far as applicable. The filamentary cathode is energized by a battery or other direct current source 12 through regulating resistance 13. The charged conductor 3 derives a sufficient positive potential from battery 14 or the like. The source 14 similarly provides a positive potential for the lens electrode 2, the relative values of these positive potentials and their ordering as to magnitude being a function of the desired lens characteristics and therefore not necessarily approximating those shown. In the system corresponding to Fig. 3A, wherein the simple electron lens of Fig. 3 is converted effectively into a compound lens system, the outer lens element 2a, similarly as elements 2 and 3, derives a positive potential by a tap to the source 14. In the circuits of both figures the sources 14 are connected symmetrically to the filaments through a mid tap in potentiometer resistances 15 connected thereacross. Here again, as in the cases of elements 2 and 3, the value of positive potential is not critical. In particular elements 2a and 3 may be at the same potential so that the resultant beams are produced in a field free space between these elements. This disposition has practical advantages in the utilization of the beams.

The idea of an electron lens grew out of certain calculations on the deflections received by electrons on passing through apertures in charged conductors. It is well known that the field about such an aperture is distorted, the potential gradient changing rapidly in intensity and in direction from point to point, and that a charged particle on passing through this distorted field receives a rather sharp deflection. The problem of calculating exactly the magnitude of deflection is an extremely difficult one. It has been found possible, however, by appropriate mathematical devices to obtain substantially correct expressions for the deflection in certain special cases, including those illustrated, as well as the spherical optical lens analog.

Fig. 4 shows the mathematic relations for the case of electrons from a rectilinear cylindrical cathode passing through a slot (equally well called a "slit") in a coaxial cylinder. This is the case illustrated by Figs. 1, 2, and 3, with the omission of the outer charged conductor 3 and may be considered as a more simple form of the type of lens illustrated by such figures or as a prototype thereof. Fig. 4A shows the corresponding optical analog.

An electron leaves the filament in azimuth $\theta$ and passes through the slot into a field-free region beyond. The deflection $\alpha$ which it receives on passing through the slot is just proportional to its angle of departure $\theta$ and the factor of proportionality is $$\frac{G_1 r_1}{2V_1}$$

as shown in the drawings, where $V_1$ represents the potential of the slotted cylinder (lens element) in relation to the filament, $G_1$ the potential gradient $$\left(\frac{dV}{dr}\right)_1$$

at the cylinder and $r_1$ the cylinder radius. The deflection is independent, to a first approximation, of the width of the slot provided this is not more than, say, 5 or 10 degrees. Because of this direct proportionality between the angle of approach and the deflection, electrons which emerge into the field-free region diverge not from the actual filament, but from a virtual one somewhat nearer the slot. If the distance of this virtual filament from the slot is represented by $x$ it may be shown that $$\frac{1}{x} = \frac{1}{r_1} - \frac{G_1}{2V_1}$$

a relation which is the familiar one of lens optics. The distance $r_1$ is to be regarded as positive when it represents displacement from the lens in the direction of motion of the beam, otherwise it is to be regarded as negative. The same conventions apply to the distance $x$. In the case under consideration both $r_1$ and $x$ are negative quantities. The relation between the incident electrons and the field about the slots (or, geometrically, between the electrons and the slots themselves) is similar in essential respects to that between incident light rays and a cylindrical lens. The field about the slot (or, geometrically, the slot itself) is the analog of a lens of focal length $$f = -\frac{2V_1}{G_1}$$

and like an optical lens, this focal length is not changed when the aperture is altered. Since the focal length of the electron lens is negative the lens is a diverging lens.

It is possible, however, to obtain a positive lens action by adding another cylinder outside the first and establishing a potential difference between the two as by the means shown in Fig. 3, which illustrates this case. The analysis for this case is shown in Figs. 5 and 5A, which correspond respectively to Figs. 4 and 4A illustrating the simpler case. The electron lens of this figure is perhaps the simplest one having provision for adequate adjustment of the geometrical characteristics of the beam. It is the one illustrated structurally in Fig. 1. The focal length of the slot, for this case, is given by the formula $$f = \frac{2V_1}{G_2 - G_1}$$

where $G_2$ is the potential gradient at the outer surface of the inner cylinder, $G_1$ for this case being the potential gradient at the inner surface of the same cylinder. More accurately these values are the gradients that would exist at the respective surfaces if the slots were not there. Obviously, this case may be reduced to the simpler case of Fig. 4 by the omission of the outer cylinder, or by by making the potentials of the two cylinders equal, and the substitution of a free field region exteriorly of the slotted cylinder. The value of $G_2$ can be varied by varying the potential impressed on the outer cylinder, as by effective variation of the voltage of source 14 of Fig. 3 or Fig. 3A, or by use of a variable tap from the outer cylinder to such source as in the instance of the inner cylinder as shown in Figs. 3 and 3A. In this case there is a complication not met with in optics. The focal length of the slot may be adjusted to direct the electrons toward a focus at a certain distance $x$ in front of the slot, as shown, but they will not pass through this focus because of the action of the field between the cylinders. They are directed by the lens action of the slot toward a focus at distance $x$, but instead of proceeding along straight lines to this focus execute curved trajectories as indicated in the figures, and reach an actual focus at a point at a greater distance $x'$. There are thus two actions, the lens action of the field about the slot in directing the electrons toward a focus, and the action of the field beyond the slot in displacing this focus outward. Means of calculating this displacement have been dveloped and are entirely satisfactory.

In an experimental demonstration of the electron lens action of the invention a structure like that of Fig. 1 was used. The radius of the inner cylinder was 0.5 centimeter, that of the outer cylinder 1.25 centimeters. The slots were 1 centimeter long with widths of .025 centimeter, .05 centimeter and .1 centimeter corresponding approximately to angular widths of 6, 12, and 18 degrees. The forms of electron beams emerging from the slots were made photographically visible by the radiations proceeding from mercury vapor which was present in the tube at a pressure of about $10^{-5}$ centimeters of mercury, this vapor being derived from a globule of mercury inserted in the tube before sealing and cooled to the temperature of melting ice.

In one demonstration the outer cylinder was given the same potential as the inner one. This condition would simulate the very simple condition assumed by Fig. 4. It was found that the field about each of the slots had the properties of a deverging lens the focal length of which corresponded quite accurately with the requirements of the formulae that have been given above and restated on the drawing in connection with Fig. 4. The effect of increasing the ratio $$\frac{V_2}{V_1}$$

that is, the ratio between the potential of the outer cylinder and the potential of the inner cylinder, should be, as it was found to be to weaken the negative lens action of the slots until it becomes zero at a critical value, when the focal length becomes minus infinity and the electrons pass through the slots without deflection. At this critical value of the ratio the focal length changes from minus infinity to plus infinity, and when further increased the focal length tends to zero as the limiting value. The positive lens action becomes more marked the greater this ratio. This has been found to be true by tests similar to the above. The focal length became infinite for the value $$\frac{V_2}{V_1} = 1.32$$

For higher values of this ratio the lens action was positive and became steadily more so as the ratio was increased. At $$\frac{V_2}{V_1} = 12$$

the electrons were brought to focus at the outer cylinder, and for still higher ratios the focus was inside this outer cylinder. It was found that the lens formulae shown in the drawings were substantially accurate for each of the three slots. The effect of the widths of the slots were found to be quite analogous to that of the opening of an optical lens.

The cylindrical lens structure illustrated is probably the simplest of the various alternatives although theoretical considerations have shown that the principle is equally applicable to other cases which are analogous to optical lenses other than cylindrical lenses.

The use of a second lens, that is, a second slotted cylinder, as in Figs. 2A, 2B, and 3A, converts the organization from a single lens system to a compound lens system, with an effect strictly analogous to the optical case.

A compound lens system of this kind may be used to produce plane parallel or convergent beams in a field-free space. This is of importance in the applications already mentioned. Such beams cannot be produced in a system comprising one lens only.

It has been shown by caluculation and demonstrated by experiment that the field about a circular hole in a charged plate (plate anode) has for electrons passing through it the properties of a spherical lens. The focal length of such a lens is given by the formula $f = 4V_1/(G_2 - G_1)$, where the symbols stand for the same quantities as in the formula for the focal length of the field about a slot. The formula is the same as for the cylindrical electron lens, except that the numerical factor is 4 instead of 2. The spherical electron lens has the same advantages over the cylindrical electron lens, as the spherical lens has over the cylindrical lens in the optics of light. It is particularly useful for forming electron images and for concentrating a beam of electrons onto a small spot.

What is claimed is:

1. An electron lens system comprising an electron emitting means, and two cylindrically walled conductor members coaxially surrounding said emitting means, said conductor members being adapted to have different positive potentials impressed thereon with respect to the electron emitting means, the inner conductor member containing an axially extending slot of geometrically regular outline, the thickness of the inner conductor member being small as compared with the width of the slot, which is small as compared with the length of the slot, and the width of the slot being such as to subtend an angle at the emitting means of not more than 12 degrees.

2. An electron lens system comprising an electron emitting means, and two cylindrically walled conductor members coaxially surrounding said emitting means, said conductor members being adapted to have different positive potentials impressed thereon with respect to the electron emitting means, the inner conductor member containing an axially extending slot of geometrically regular outline, the two conductor members being spaced from the emitting means approximately .5 of a centimeter and 2 centimeters, the thickness of the inner conductor member being small as compared with the width of the slot, which is small as compared with the length of the slot, and the width of the slot being such as to subtend an angle at the emitting means of not more than 12 degrees.

CLINTON J. DAVISSON.